US009547903B2

(12) United States Patent
Wu et al.

(10) Patent No.: US 9,547,903 B2
(45) Date of Patent: Jan. 17, 2017

(54) METHOD FOR QUANTIFYING CARIES

(71) Applicant: CARESTREAM HEALTH, INC., Rochester, NY (US)

(72) Inventors: Yingqian Wu, Shanghai (CN); Wei Wang, Shanghai (CN); Yuan Chen, Shanghai (CN); Victor C. Wong, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 14 days.

(21) Appl. No.: 14/687,965

(22) Filed: Apr. 16, 2015

(65) Prior Publication Data
US 2016/0307323 A1    Oct. 20, 2016

(51) Int. Cl.
G06T 7/00       (2006.01)
G06T 11/60      (2006.01)
G06T 11/00      (2006.01)

(52) U.S. Cl.
CPC .......... G06T 7/0038 (2013.01); G06T 11/001 (2013.01); G06T 11/60 (2013.01); G06T 2207/10016 (2013.01); G06T 2207/10024 (2013.01); G06T 2207/10064 (2013.01); G06T 2207/30036 (2013.01); G06T 2207/30096 (2013.01)

(58) Field of Classification Search
CPC combination set(s) only.
See application file for complete search history.

(56) References Cited

U.S. PATENT DOCUMENTS

| 4,479,499 | A | 10/1984 | Alfano |
| 4,515,476 | A | 5/1985 | Ingmar |
| 6,231,338 | B1 | 5/2001 | de Josselin de Jong et al. |
| 8,311,302 | B2 * | 11/2012 | Yan ...................... A61B 5/0088 382/128 |
| 8,371,848 | B2 * | 2/2013 | Okawa ..................... A61B 1/24 433/29 |
| 8,768,016 | B2 | 7/2014 | Pan et al. |
| 9,020,228 | B2 * | 4/2015 | Yan ...................... G06T 7/0081 348/66 |

(Continued)

FOREIGN PATENT DOCUMENTS

WO    2010/083623    7/2010

OTHER PUBLICATIONS

Luc Vincent, Morphological Grayscale Reconstruction in Image Analysis: Applications and Efficient Algorithms, IEEE Transactions on Image Processing, 2, Apr. 1993, No. 2, pp. 176-201.

*Primary Examiner* — Anand Bhatnagar

(57) ABSTRACT

Method and/or apparatus embodiments for automatically identifying caries, executed at least in part on data processing hardware, can acquire, multiple reflectance images of a tooth, wherein each reflectance image includes at least red, green, and blue intensity values for a region of pixels corresponding to the tooth. Each reflectance image in the plurality of reflectance images is processed by (i) defining a tooth region within the reflectance image; and (ii) identifying caries within the defined tooth region for each reflectance image. The reflectance images are registered and the registered processed images are combined to form a result image that shows the identified caries. In one embodiment, multiple reflectance images of a tooth are taken from substantially the same camera position.

19 Claims, 6 Drawing Sheets

(56) References Cited

U.S. PATENT DOCUMENTS

| | | | |
|---|---|---|---|
| 9,020,236 B2* | 4/2015 | Wang | A61B 5/0088 382/132 |
| 2004/0202356 A1 | 10/2004 | Stookey et al. | |
| 2004/0240716 A1 | 12/2004 | de Josselin de Jong et al. | |
| 2005/0283065 A1* | 12/2005 | Babayoff | A61B 1/00009 600/407 |
| 2007/0099148 A1 | 5/2007 | Wong et al. | |
| 2008/0056551 A1 | 3/2008 | Wong et al. | |
| 2008/0063998 A1 | 3/2008 | Liang et al. | |
| 2008/0170764 A1* | 7/2008 | Burns | A61B 5/0088 382/128 |
| 2011/0085715 A1* | 4/2011 | Yan | G06T 7/0081 382/128 |
| 2011/0117025 A1* | 5/2011 | Dacosta | A61B 5/0059 424/9.6 |
| 2012/0148986 A1* | 6/2012 | Yan | A61B 5/0088 433/215 |
| 2013/0038710 A1* | 2/2013 | Inglese | A61B 5/0071 348/66 |
| 2013/0203008 A1* | 8/2013 | Kressman | A46B 15/0034 433/27 |
| 2014/0037180 A1* | 2/2014 | Wang | A61B 5/0088 382/132 |
| 2014/0185892 A1* | 7/2014 | Pan | A61B 5/0088 382/128 |
| 2015/0037750 A1* | 2/2015 | Moalem | A61B 5/0088 433/29 |
| 2015/0164335 A1* | 6/2015 | Van Der Poel | A61C 9/0053 433/29 |
| 2016/0022389 A1* | 1/2016 | Esbech | G01J 3/513 250/208.1 |
| 2016/0125601 A1* | 5/2016 | Wu | G06T 7/0012 382/128 |

* cited by examiner

METHOD FOR QUANTIFYING CARIES

FIELD OF THE INVENTION

The invention relates generally to the field of dental imaging, and in particular to a method and an apparatus for detection of caries. More specifically, the invention relates to a method and an apparatus for quantifying caries in tooth images captured using fluorescence and scattering of light.

BACKGROUND OF THE INVENTION

While there have been improvements in detection, treatment and prevention techniques, dental caries remains a prevalent condition affecting people of all age groups. If not properly and promptly treated, caries could lead to permanent tooth damage and even to loss of teeth.

Traditional methods for caries detection include visual examination and tactile probing with a sharp dental explorer device, often assisted by radiographic (x-ray) imaging. Detection using these methods can be somewhat subjective, varying in accuracy due to many factors, including practitioner expertise, location of the infected site, extent of infection, viewing conditions, accuracy of x-ray equipment and processing, and other factors. There are also hazards associated with conventional detection techniques, including the risk of damaging weakened teeth and spreading infection with tactile methods as well as exposure to x-ray radiation. By the time a caries condition is evident under visual and tactile examination, the disease is generally in an advanced stage, requiring a filling and, if not timely treated, possibly leading to tooth loss.

In response to the need for improved caries detection methods, there has been considerable interest in improved imaging techniques that do not employ x-rays. One method employs fluorescence wherein teeth are illuminated with high intensity blue light. This technique, sometimes termed quantitative light-induced fluorescence (QLF), operates on the principle that sound, healthy tooth enamel yields a higher intensity of fluorescence under excitation from some wavelengths than does de-mineralized enamel that has been damaged by caries infection. The correlation between mineral loss and loss of fluorescence for blue light excitation is then used to identify and assess carious areas of the tooth. A different relationship has been found for red light excitation, a region of the spectrum for which bacteria and bacterial by-products in carious regions absorb and fluoresce more pronouncedly than do healthy areas.

Applicants note some references related to optical detection of caries.

U.S. Pat. No. 4,515,476 (Ingmar) describes the use of a laser for providing excitation energy that generates fluorescence at some other wavelength for locating carious areas.

U.S. Pat. No. 6,231,338 (de Josselin de Jong et al.) describes an imaging apparatus for identifying dental caries using fluorescence detection.

U.S. Patent Application Publication No. 2004/0240716 (de Josselin de Jong et al.) describes methods for improved image analysis for images obtained from fluorescing tissue.

U.S. Pat. No. 4,479,499 (Alfano) describes a method for using transillumination to detect caries based on the translucent properties of tooth structure.

Among products for dental imaging using fluorescence behavior is the QLF Clinical System from Inspektor Research Systems BV, Amsterdam, The Netherlands. The Diagnodent Laser Caries Detection Aid from KaVo Dental Corporation, Lake Zurich, Ill., USA, detects caries activity monitoring the intensity of fluorescence of bacterial by-products under illumination from red light.

U.S. Patent Application Publication No. 2004/0202356 (Stookey et al.) describes mathematical processing of spectral changes in fluorescence in order to detect caries in different stages with improved accuracy. Acknowledging the difficulty of early detection when using spectral fluorescence measurements, the '2356 Stookey et al. disclosure describes approaches for enhancing the spectral values obtained, effecting a transformation of the spectral data that is adapted to the spectral response of the camera that obtains the fluorescent image.

While the described methods and apparatus are intended for non-invasive, non-ionizing imaging methods for caries detection, there is still room for improvement. One recognized drawback with existing techniques that employ fluorescence imaging relates to image contrast. The image provided by fluorescence generation techniques such as QLF can be difficult to assess due to relatively poor contrast between healthy and infected areas. As noted in the 2004/0202356 Stookey et al. disclosure, spectral and intensity changes for incipient caries can be very slight, making it difficult to differentiate non-diseased tooth surface irregularities from incipient caries.

Overall, it is recognized that, with fluorescence techniques, the image contrast that is obtained corresponds to the severity of the condition. Accurate identification of caries using these techniques often requires that the condition be at a more advanced stage, beyond incipient or early caries, because the difference in fluorescence between carious and sound tooth structure is very small for caries at an early stage. In such cases, detection accuracy using fluorescence techniques may not show marked improvement over conventional methods. Because of this shortcoming, the use of fluorescence effects appears to have some practical limits that prevent accurate diagnosis of incipient caries. As a result, a caries condition may continue undetected until it is more serious, requiring a filling, for example.

Detection of caries at very early stages is of particular interest for preventive dentistry. As noted earlier, conventional techniques generally fail to detect caries at a stage at which the condition can be reversed. As a general rule of thumb, incipient caries is a lesion that has not penetrated substantially into the tooth enamel. Where such a caries lesion is identified before it threatens the dentin portion of the tooth, remineralization can often be accomplished, reversing the early damage and preventing the need for a filling. More advanced caries, however, grow increasingly more difficult to treat, most often requiring some type of filling or other type of intervention.

To take advantage of opportunities for non-invasive dental techniques to forestall caries, it is most useful for caries be detected at the onset. In many cases, as is acknowledged in the 2004/0202356 Stookey et al. disclosure, this level of detection has been found to be difficult to achieve using existing fluorescence imaging techniques, such as QLF. As a result, early caries can continue undetected, so that by the time positive detection is obtained, the opportunity for reversal using low-cost preventive measures can be lost.

In commonly-assigned U.S. Patent Application Publication No. 2008/0056551, a method and apparatus that employs both the reflectance and fluorescence images of the tooth is used to detect caries. The described approach takes advantage of the observed back-scattering, or reflectance, for incipient caries and combines this data with fluorescence effects to provide an improved dental imaging technique to detect caries. The technique, referred to as Fluorescence Imaging with Reflectance Enhancement (FIRE), helps to increase the contrast of images over that of earlier approaches, and also makes it possible to detect incipient caries at stages when preventive measures are likely to take effect. Advantageously, FIRE detection can be accurate at an earlier stage of caries infection than has been exhibited using existing fluorescence approaches that measure fluorescence alone. The application describes a downshifting method to generate the FIRE image.

Commonly-assigned copending PCT/CN2009/000078, entitled METHOD FOR DETECTION OF CARIES describes a morphological method for generating a FIRE image with reduced sensitivity to illumination variation.

Quantification of caries based on a digital image of a tooth such as a fluorescence image provides numerical information on the severity of lesion regions and can help dentists make and carry out treatment plans. It can be a useful tool in the longitudinal monitoring of caries for dentists to observe the evolution of each lesion area over time. U.S. Patent Application Publication No. 2004/0240716 (de Jong et al.) has disclosed some methods for quantification of caries; however, the disclosed methods generally require manual extraction of lesion regions from sound tooth areas of the image by the user, and they are based on fluorescence-only images. Manual extraction of lesion regions from the image presents two problems. Firstly, the extraction process is slow, requiring the user to make many mouse clicks or to draw lines on the images to indicate the boundary of a lesion region. Secondly, manual extraction requires considerable caries diagnostic experience on the part of the user and is generally subjective. In addition, fluorescence-only images display incipient caries at relatively low contrast, further adding difficulty to the manual lesion extraction process. Therefore, in the disclosed methods, only compromised caries quantification results are achieved at best.

Methods using FIRE image acquisition and recomposition have proved to be helpful for identifying caries conditions at various stages. Although the use of FIRE techniques has provided a significant advance for caries detection, however, there is still room for improvement. One area where performance can be improved relates to accuracy and consistency of detection. Under some conditions, the use of a single reflectance image may not provide a sufficiently clear indication of the health of the corresponding tooth. Since the reflectance image, also termed the white light image, shows scattered light, it can be difficult to obtain consistently accurate information from this image. Even where the fluorescence image content is clear, shortcomings of the reflectance image can compromise the results obtained in FIRE image composition.

Thus, it can be seen that there is a need for improved methods for quantifying caries in a tooth image using information obtained from reflectance and fluorescence images.

SUMMARY OF THE INVENTION

An object of the present disclosure is to address the need for apparatus and/or method embodiments that can identify and/or quantify caries in a digital image of a tooth. Methods and/or apparatus embodiments of the present disclosure can use information obtained from multiple reflectance images and, optionally a fluorescence image.

An advantage of the present invention is that carious lesions in tooth images are identified without user intervention, thus providing an efficient workflow in automatic caries identification and monitoring.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for automatically identifying caries, executed at least in part on data processing hardware, the method can include acquiring, from substantially the same camera position, a plurality of reflectance images of a tooth, wherein each reflectance image includes at least red, green, and blue intensity values for a region of pixels corresponding to the tooth; processing each reflectance image in the plurality of reflectance images by: (i) defining a tooth region within the reflectance image; and (ii) identifying caries within the defined tooth region for each reflectance image; registering the plurality of reflectance images; and combining the registered plurality of processed images to form a result image that shows the identified caries.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
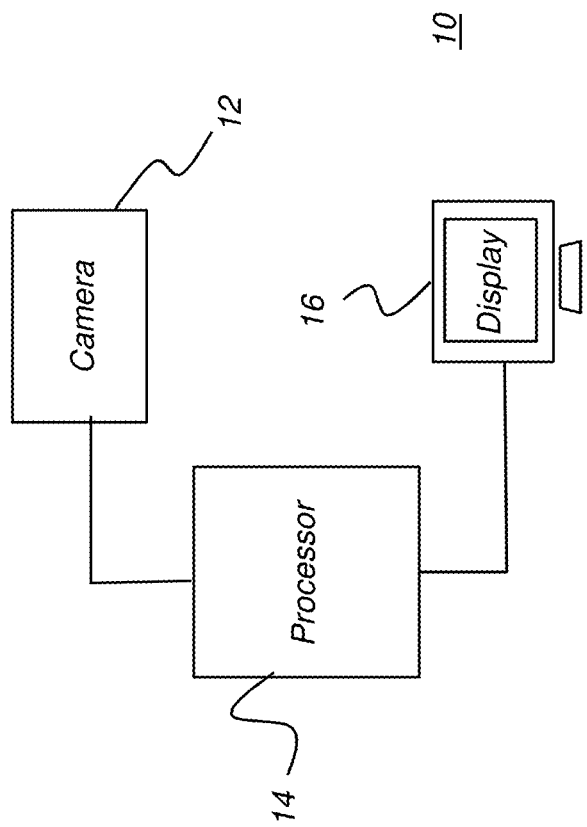
FIG. 1 shows a schematic diagram of an imaging apparatus according to an embodiment of the present disclosure.

The following is a detailed description of the preferred embodiments of the invention, reference being made to the drawings in which the same reference numerals identify the same elements of structure in each of the several figures.

Reference is made to PCT/CN2009/000078, filed on Jan. 20, 2009, entitled METHOD FOR DETECTION OF CARIES, by Wei Wang et al.

Reference is made to U.S. Patent Application Publication No. 2008/0056551, published Mar. 6, 2008, entitled METHOD FOR DETECTION OF CARIES, by Wong et al.

Reference is made to U.S. Patent Application Publication No. 2008/0063998, published Mar. 13, 2008, entitled APPARATUS FOR CARIES DETECTION, by Liang et al.

Reference is made to U.S. Patent Application Publication No. 2008/0170764, published Jul. 17, 2008, entitled SYSTEM FOR EARLY DETECTION OF DENTAL CARIES, by Burns et al.

Reference is made to U.S. Patent Publication No. 2007/0099148, published on May 3, 2007, entitled METHOD AND APPARATUS FOR DETECTION OF CARIES, by Wong et al.

Where they are used herein, the terms "first", "second", and so on, do not necessarily denote any ordinal, sequential, or priority relation, but are simply used to more clearly distinguish one element or set of elements from another, unless specified otherwise.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the terms "viewer", "operator", "observer", and "user" are considered to be equivalent and refer to the viewing practitioner, technician, or other person who views and manipulates an image, such as a dental image, on a display monitor or other viewing apparatus. An "operator instruction" or "viewer instruction" is obtained from explicit commands entered by the viewer, such as by clicking a button on a camera or by using a computer mouse or by touch screen or keyboard entry.

The term "highlighting" for a displayed feature has its conventional meaning as is understood to those skilled in the information and image display arts. In general, highlighting uses some form of localized display enhancement to attract the attention of the viewer. Highlighting a portion of an image, such as an individual tooth or a set of teeth or other structure(s) can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

In the context of the present disclosure, the phrase "reflectance image" indicates an image that is obtained from reflection of one or more visible light sources from the surface of the tooth and has image content within the same spectral range as the incident light that is directed toward the tooth. A fluorescence image, by contrast, is obtained by directing an excitation light source toward the tooth and recording the fluoresced light that is output from the tooth tissue in response to the excitation energy. The wavelength range of the excitation light source differs from that of the fluoresced light energy.

An image is displayed according to image data that can be acquired by a camera or other device, wherein the image data represents the image as an ordered arrangement of pixels. Image content may be displayed directly from acquired image data or may be further processed, such as to combine image data from different sources or to highlight various features of tooth anatomy represented by the image data, for example. As used in the context of the present disclosure, the terms "image" and "image data" are generally synonymous.

The term "at least one of" is used to mean one or more of the listed items can be selected. The term "about" indicates that the value listed can be somewhat altered, as long as the alteration does not result in nonconformance of the process or structure to the illustrated embodiment. The term "exemplary" indicates that a particular description or instance is used by way of example, rather than implying that it is an ideal.

In this disclosure, the word "intensity" is used to refer to light level, and is also broadly used to refer to the value of a pixel in a digital image. The term "water basin" as used herein is a term of art used to describe a structure that is identified and used in executing a marker-controlled watershed transformation in the imaging arts. The term "catchment basin" is sometimes used in the same way. References in this disclosure to "water basin" refer to this imaging arts construct.

Note that the phrase "extracting a lesion area," as used in the present application, means identifying at least one lesion area in a digital tooth image.

The term "in signal communication" as used in the present disclosure means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the image processing field, there are many well known methods used to extract features from images, including but not limited to threshold, top-hat, and morphological grayscale reconstruction techniques (see Luc Vincent, "Morphological grayscale reconstruction in image analysis: applications and efficient algorithms", *IEEE Transaction on Image Processing*, Vol. 2, No. 2, pp. 176-201, 1993). However, not every technique is suitable for segmenting lesions from an image of a tooth. Teeth images have many characteristics that pose challenges for doing automatic lesion extraction. For example, a tooth image has no flat background (sound tooth areas are the background of the target caries), the caries have no fixed sizes and shapes, and surface contour and curvature of teeth cause uneven illumination, resulting in intensity variation across the tooth image. The present invention overcomes these difficulties by employing a combination of different image processing techniques that address the various problems specific to automatic processing of teeth images.

The schematic diagram of FIG. 1 shows an imaging apparatus 10 with a processor 14 that acts as data processing hardware and acquires image content about one or more teeth from a camera 12. Processor 14 processes the image data according to subsequent description. Processor 14 then shows results of logic processing on a display 16. Camera 12 and display 16 are in signal communication with processor 14.

Method and/or apparatus embodiments of the present disclosure can identify caries at beginning stages and/or advanced stages using a combination of multiple reflectance images obtained before performing caries quantification. In certain exemplary method and/or apparatus embodiments, a series or set of reflectance images and at least one fluorescence image, a series or set of reflectance images with a plurality of fluorescence images, or set of reflectance images each including at least one fluorescence image are obtained with the digital camera maintained in substantially the same position (e.g., sufficiently close to register the multiple reflectance images and/or fluorescence images).

Figure 2:
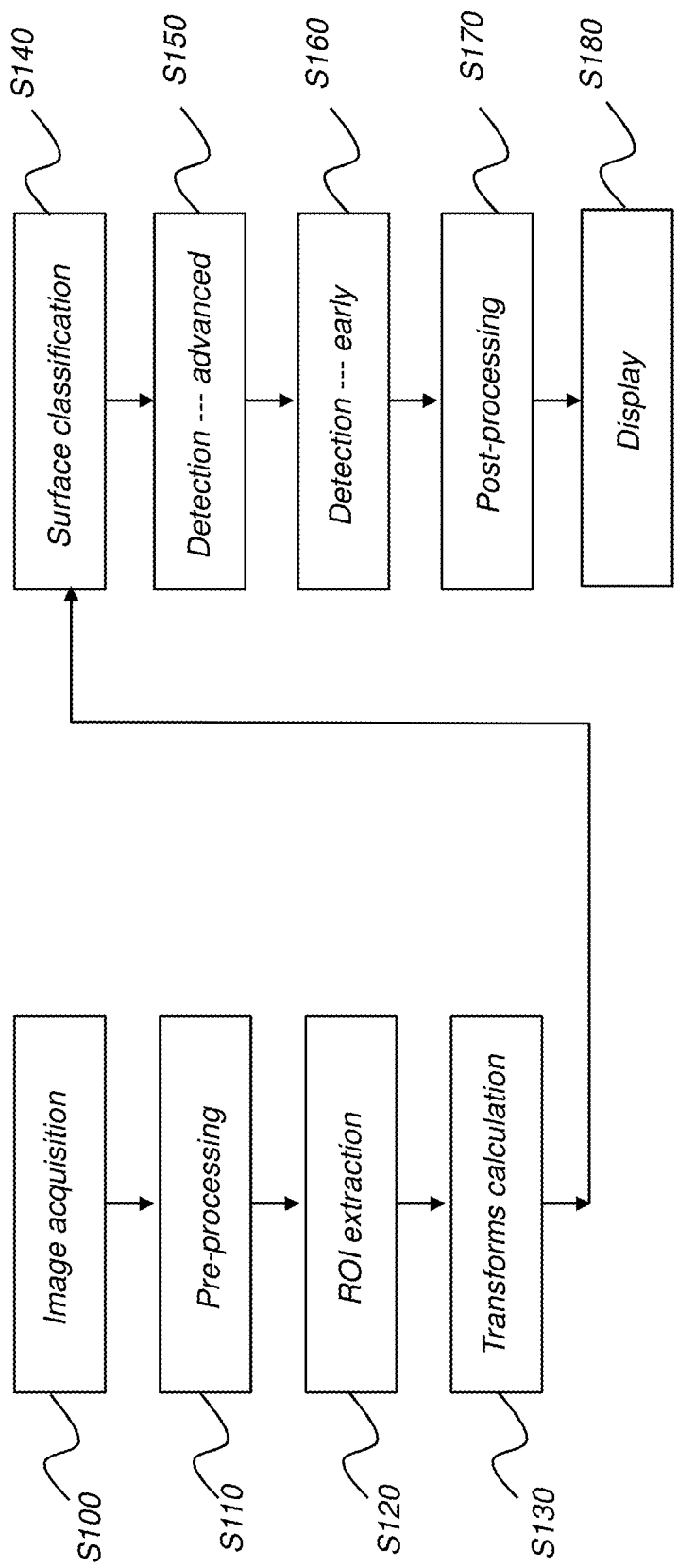
FIG. 2 is a logic flow diagram that shows a sequence for processing and display of detected caries by the imaging apparatus.

The logic flow diagram of FIG. 2 shows a sequence for identifying caries at beginning and advanced stages using a combination of multiple reflectance images obtained before performing caries quantification according to an embodiment of the application. The logic flow diagram of FIG. 2 can be used with the imaging apparatus of FIG. 1. In an image acquisition step S100, a series or set of reflectance images and at least one fluorescence image are obtained with the digital camera maintained in substantially the same position. A pre-processing step S110 then computes various values, including a Red:Green (R:G) ratio for each tooth pixel in each reflectance image. An R:G ratio image can be generated and can be used to identify one or more tooth regions, with an image array showing the value of each image pixel according to its calculated R and G values and corresponding R:G ratio. An ROI (Region of Interest) extraction step S120 uses the R:G value to distinguish tooth areas or tooth regions that may require treatment from background tissue. ROI extraction processing is performed within each reflectance image.

Continuing with the logic flow of FIG. 2, a transforms calculation step S130 is executed, in which translation transform T(i) and rotation transform R(i) are calculated. Transforms T(i) and R(i) are used for image registration in subsequent steps. Registration processing aligns the reflectance images to each other and is helpful for refining ROI boundary definition, since there can be some slight movement from one image capture to the next, even where camera position or tooth position are well maintained.

It should be noted that relative movement between the tooth and camera are of interest and can require adjustment. The camera should be in substantially the same position relative to a tooth for imaging the tooth. Any shift or rotation between two adjacently captured images in the series of reflectance images should be no more than slightly noticeable to the unaided eye.

To accomplish any needed registration adjustment, processing can use a 2-D affine transform, including rotation R(i), and translation T(i) between adjacently captured reflectance images, for all i images. Thus, given the set of N reflectance images, an image i is registered to align with its adjacently captured reflectance image i+1 in the set using a 2-D affine transform, including a rotation matrix R(i) and a translation vector T(i), between image i and image i+1. Alternatively, in one embodiment, registration adjustment, processing can use a 2-D affine transform, including rotation R(i), and translation T(i) between a sub set of the set of captured reflectance images that are from substantially the same position relative to a tooth/teeth for imaging the tooth/teeth.

According to an embodiment of the present disclosure, an improved Iterative Closest Point (ICP) algorithm can be used in order to estimate transform parameters. A tooth surface classification step S140 follows, in which processing determines whether the surface that has been imaged is occlusal or buccal-lingual. PCA (Principal Component Analysis) and a trained linear classifier are used for classification step S140 according to an embodiment of the present disclosure; other utilities, including other types of trained algorithms, could alternately be used for this purpose.

The next two steps in the FIG. 2 sequence use the preceding processing in order to perform caries detection. An advanced caries detection step S150 is executed, using information gained when obtaining the R:G ratio. In the green (G) channel image, advanced caries appears as darkened areas. In the R:G ratio image, advanced caries has a different appearance, as brighter areas against a darker background. Morphological operators that are used for this analysis include bottom-hat and top-hat filtering, and are applied to the green channel and to the R:G ratio image. To enhance sensitivity, eight structure elements, formed from rectangles of four orientations and at two scales, are used in image analysis. According to an embodiment of the present disclosure, floating-point valued results from multiple reflectance images are combined through operations commonly used in the image processing art such as averaging in order to more accurately identify suspicious "brown-spot" regions that are indicative of advanced caries. Suspected regions of advanced caries are then further processed by averaging results from each reflectance image in order to help suppress noise and disturbance effects. Prior to averaging, each reflectance image can be adjusted for registration with the other reflectance images, such as using the previously described R(i) rotation matrix and T(i) vector transforms, by warping, or the like. In one embodiment, the averaged floating-point valued brown spot regions can then be binarized, using a threshold value, in order to obtain a more consistently accurate brown spot region that is indicative of advanced caries.

Detection for early caries in early caries detection step S160 of FIG. 2 can depend on the surface detection performed earlier as well as on the location along the tooth surface. For the smoother buccal or lingual surface, only white spots in regions very near the gingival line are of interest. An adaptive image reconstruction method can be used for identifying early caries in this case. Steps in the process for detecting early caries along buccal or lingual surfaces include generating a local maximum image by designating one of the acquired reflectance images as mask and another as marker. Image reconstructions are performed using vertical and horizontal line-shaped structures. These reconstructions can be subtracted from the original image data in order to obtain a binary Local Maximum image. Using this result, local dynamic range calculations can be made and adaptive image reconstruction performed in order to accentuate areas indicative of early caries. Adaptive image reconstruction techniques similar to those described in commonly assigned U.S. Pat. No. 8,768,016 entitled "Method for Quantifying Caries" to Pan et al. can be used, for example.

Steps for detecting early caries along occlusal surfaces include using disc-shaped structure elements with increasing size and sequential top-hat operations to detect lighter colored areas or "white" spots that are indicative of caries on occlusal surfaces. The float-point valued results of top-hat processing for each reflectance image are combined. The results of white-light image processing are registered and averaged for suppressing false positives, such as using the previously described R(i) rotation matrix and T(i) vector transforms or by warping. It should be noted that registration could also be performed at an earlier point of FIG. 2 processing, such as preceding or following tooth surface classification step S140. The averaged result is then binarized using a threshold and processed with sequential morphologic operators. The thresholded morphologic edge regions are also obtained as part of this processing. The final set of suspect spots are obtained by a binary reconstruction using thresholded edge regions as markers and the binary white spots as masks.

Figure 3:
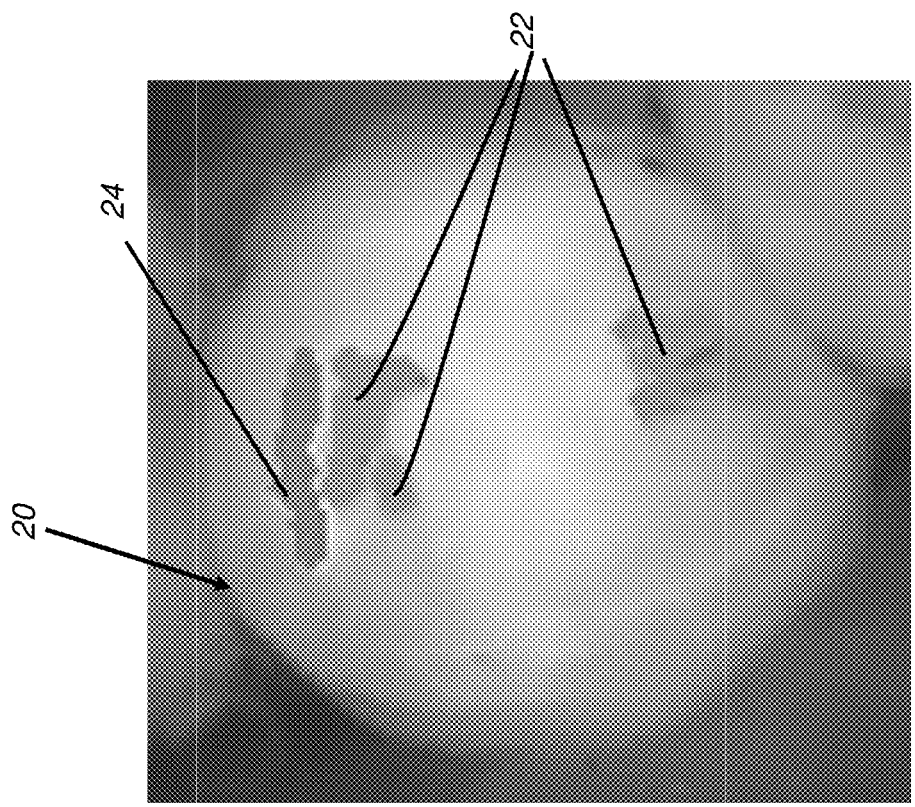
FIG. 3 is an image of a displayed tooth showing highlighting for advanced and incipient caries.

Still following the sequence of FIG. 2, a post-processing step S170 processes detected spots using techniques such as morphological opening. The detected white spots and brown areas can be labeled as early and advanced caries, respectively. A display step S180 displays a result image that shows processing results, with caries detection variously highlighted as known to one skilled in the art. In the example shown in FIG. 3, different color/texture highlighting of the displayed tooth 20 is provided in a result image 30 to indicate advanced caries 22 or incipient caries 24 in tooth 20 determined according to embodiments of the application.

Figure 4:
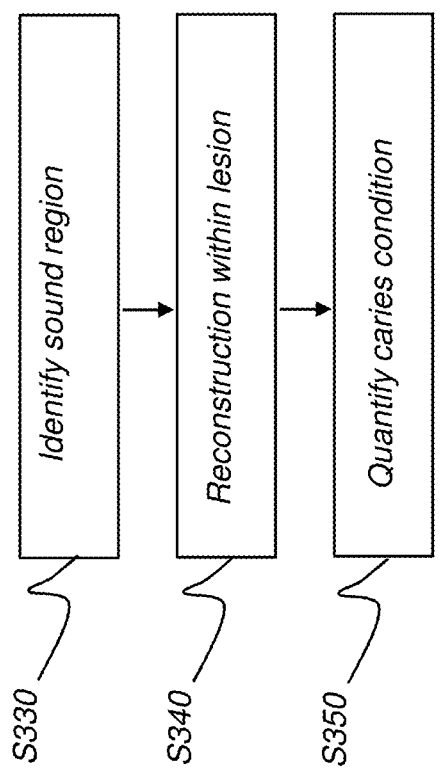
FIG. 4 is a logic flow diagram that shows steps in a sequence for quantifying caries.

Referring to FIG. 4, there are shown some steps that can be used for caries quantification, based on comparison against healthy tooth regions according to embodiments of the application. In a sound region identification step S330, a tooth region adjacent to a suspected caries region is identified. In a reconstruction step S340, the process reconstructs intensity values for tooth tissue within the lesion area according to values in the adjacent sound region. A quantifications step S350 then provides a quantitative value indicative of the detected caries condition. The quantitative value can be displayed directly or used to adjust the highlighting that is provided for the display of caries, as in the example of FIG. 3.

Figure 5B:
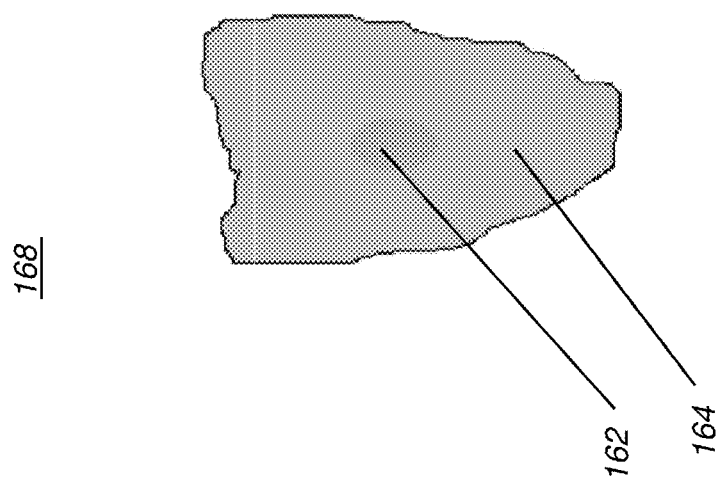
FIG. 5B shows a fluorescence image that is typically obtained using excitation light that is within or near the ultraviolet (UV) range.
Figure 5A:
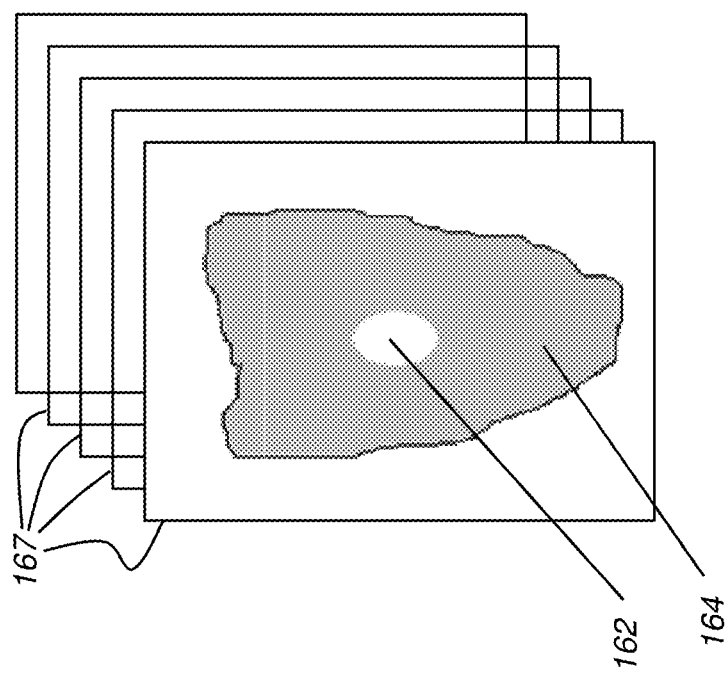
FIG. 5A shows a sequence of reflectance images obtained using visible light.

FIGS. 5A and 5B show illustratively a plurality of reflectance images 167 and a fluorescence image 168 with a sound tooth area 164 and an early lesion area (or caries region) 162 according to an embodiment of the application. Generally, in a reflectance image 167, such as a white light reflectance image, the intensity of early caries regions is higher than that of their surrounding sound areas. In contrast, in a fluorescence image 168, such as one obtained under blue excitation light, the intensity of caries regions is lower than that of their surrounding sound areas because of the fluorescence loss in caries regions.

After the false positives are removed by methods such as disclosed in the commonly assigned U.S. Pat. No. 8,768,016 entitled "Method for Quantifying Caries" to Pan et al., the remaining suspicious caries areas are the extracted lesion regions of caries 162. These areas may be outlined or highlighted with false colors in a displayed fluorescence, or reflectance image of the teeth. They are also used for caries quantification analysis, in the steps described below.

Advantageously, each image in the reflectance image set that is obtained is individually checked for a caries condition. This checking is performed either before or after image registration. In one embodiment, caries quantification is performed on early caries in the result image 30.

Reconstructing Intensity Values for Tooth Tissue within the Lesion Area

For assessing the severity of the extracted lesions and for monitoring the development of the identified lesions over time, it is helpful to have an estimate of the normal intensity values of the suspicious caries regions before the development of caries. This can be performed through various approaches based on the intensity values of the surrounding normal/sound areas found in Step S330 of FIG. 4.

In one embodiment, after the surrounding sound area is identified, the reconstructed intensity value for tooth tissue within the lesion area can be obtained using a bilinear interpolation technique according to values in the adjacent sound region as described below.

Figure 6:
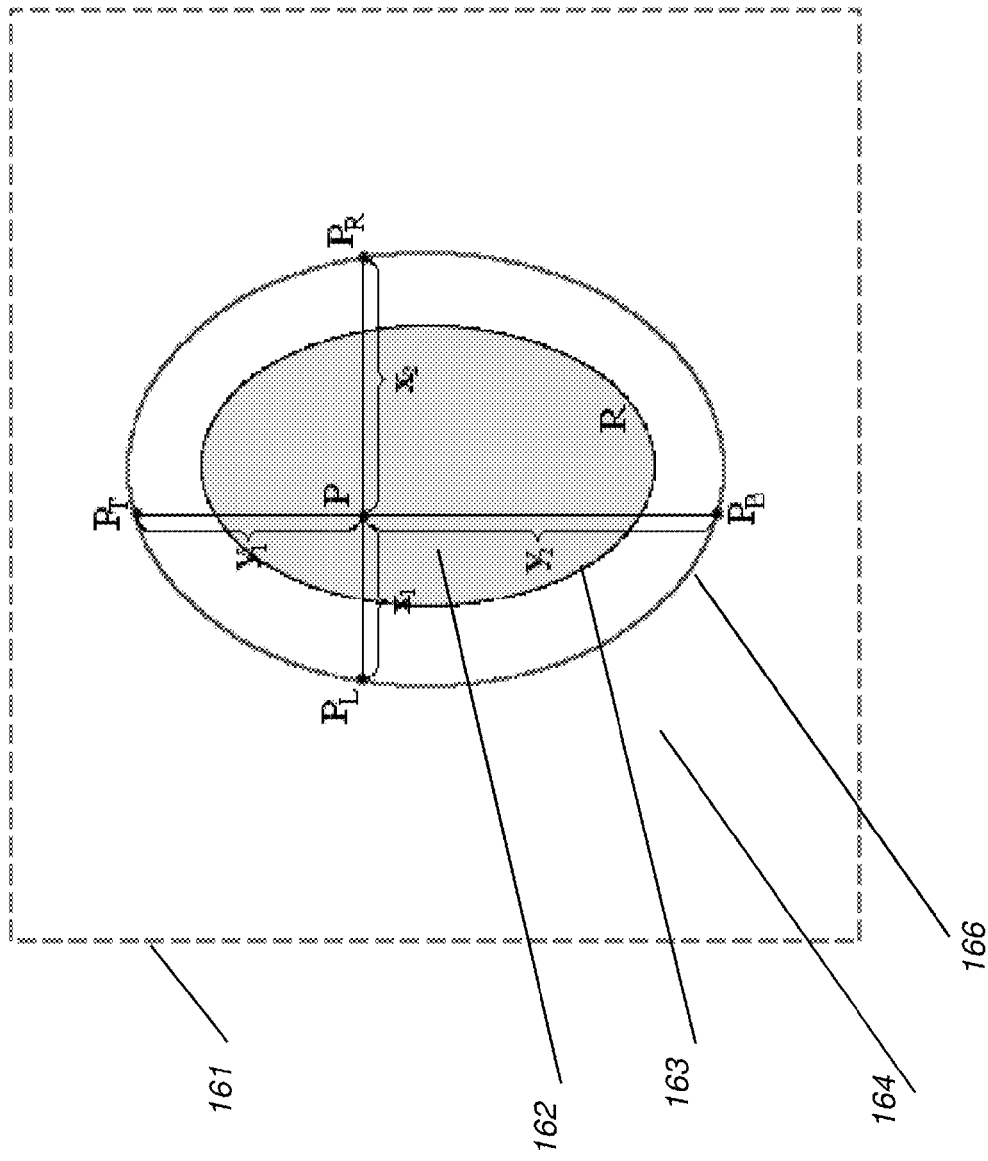
FIG. 6 shows a region of interest with typical points used for intensity interpolation.

FIG. 6 shows an exploded view of a region of interest 161. For each pixel P in the lesion area R 162, there are four pixels on the dilated line 166 in the sound area that are to the left, right, top, and bottom of P, named $P_L$, $P_R$, $P_T$, $P_B$, respectively. Segmentation border 163 is shown.

The estimation of the reconstructed intensity value $I_r$ at P can be calculated using a bilinear interpolation, for which the formulae are shown below.

$$I_H = \frac{I_L \cdot x_2 + I_R \cdot x_1}{x_2 + x_1}$$

$$I_V = \frac{I_T \cdot y_2 + I_B \cdot y_1}{y_2 + y_1}$$

$$I_r = \frac{I_H + I_V}{2}$$

Bilinear interpolation is carried out in this way for every pixel in the region of caries 162 to reconstruct the normal intensity values for the whole region.

As an alternative embodiment, after the surrounding sound area is identified, the reconstructed intensity value for tooth tissue within the lesion area can be obtained using a surface fitting technique such as a two-dimensional spline, or Bézier fit.

Another alternative embodiment for reconstructing intensity value for tooth tissue within the lesion area is to smoothly interpolate inward from the pixel's values on the boundaries of the expanded suspicious caries areas by solving Laplace's equation. This embodiment is an adaptation of a common image processing technique (such as what has been implemented in the familiar Matlab software function "roifill" in its image processing toolbox), and results in more accurate estimation.

Quantifying the Condition of the Caries

As discussed above, quantitative information on the regions of caries 162 is helpful for assessing the condition of the extracted lesions and for monitoring the development of the identified lesions over time. The condition of caries in a tooth image can be quantified in a number of ways, including calculating the size (or area) of the lesion area and calculating fluorescence loss ratio of the lesion area.

In one example, the lesion area is calculated by counting the actual pixel number within the regions of caries 162, and then converting that to actual spatial dimension, such as $mm^2$.

In another example, the fluorescence loss is used to measure the condition of the caries. Fluorescence loss in tooth structure has been demonstrated to be a direct indication of the degree of demineralization in the structure. This quantity can be directly calculated from the intensity values in the tooth's fluorescence image. In the fluorescence image, the fluorescence loss ratio $\Delta F$ at each pixel within the lesion area is calculated using the formula below:

$$\Delta F = \frac{I_r - I_o}{I_r},$$

where $I_r$ is the reconstructed intensity value from step 140, and $I_o$ is the actual measured intensity value of the green channel of the fluorescence image $I_{Fluo}$. Where caries has occurred, $\Delta F > 0$.

The whole fluorescence loss L of the lesion region is the sum of ΔF within the lesion region R:

$$L = \sum_{i \in R} \Delta F_i$$

Embodiments of the present disclosure obtain an improved ROC (Receiver Operative Characteristic) and improved consistency over earlier methods using reflectance images for caries detection.

This invention includes calculation steps. Those skilled in the art will recognize that these calculation steps may be performed by data processing hardware that is provided with instructions for image data processing. Because such image manipulation systems are well known, the present description is directed more particularly to algorithms and systems that execute the method of the present invention. Other aspects of such algorithms and systems, and data processing hardware and/or software for producing and otherwise processing the image signals may be selected from such systems, algorithms, components and elements known in the art. Given the description as set forth in the following specification, software implementation lies within the ordinary skill of those versed in the programming arts.

The stored instructions of such a software program may be stored in a computer readable storage medium, which may comprise, for example: magnetic storage media such as a magnetic disk or magnetic tape; optical storage media such as an optical disc, optical tape, or machine readable bar code; solid state electronic storage devices such as random access memory (RAM), or read only memory (ROM); or any other physical device or medium employed to store a computer program. Using such software, the present invention can be utilized on a data processing hardware apparatus, such as a computer system or personal computer, or on an embedded system that employs a dedicated data processing component, such as a digital signal processing chip.

Consistent with one embodiment, the present invention utilizes a computer program with stored instructions that perform on image data that is accessed from an electronic memory. As can be appreciated by those skilled in the image processing arts, a computer program of an embodiment of the present invention can be utilized by a suitable, general-purpose computer system, such as a personal computer or workstation that acts as an image processor or other type of data processing hardware. However, many other types of computer systems can be used to execute the computer program of the present invention, including an arrangement of networked processors, for example. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the art will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and data processing hardware and/or software for producing and otherwise processing the images or co-operating with the computer program product of the present invention, are not specifically shown or described herein and may be selected from such algorithms, systems, hardware, components and elements known in the art.

Although, exemplary embodiments of the application has been described using color groups of red, green and blue. As known to one skilled in the art, other color groups can be used.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

Exemplary embodiments according to the application can include various features described herein (individually or in combination).

While the invention has been illustrated with respect to one or more implementations, alterations and/or modifications can be made to the illustrated examples without departing from the spirit and scope of the appended claims. In addition, while a particular feature of the invention can have been disclosed with respect to one of several implementations, such feature can be combined with one or more other features of the other implementations as can be desired and advantageous for any given or particular function. Other embodiments of the invention will be apparent to those skilled in the art from consideration of the specification and practice of the invention disclosed herein. It is intended that the specification and examples be considered as exemplary only, with a true scope and spirit of the invention being indicated by the following claims, and all changes that come within the meaning and range of equivalents thereof are intended to be embraced therein.

What is claimed is:

1. A method for automatically identifying caries, executed at least in part on data processing hardware, the method comprising:
   acquiring, from substantially the same camera position, a plurality of reflectance images of a tooth, wherein each reflectance image includes at least red, green, and blue intensity values for a region of pixels corresponding to the tooth;
   processing each reflectance image in the plurality of reflectance images by:
      (i) defining a tooth region within the reflectance image; and
      (ii) identifying caries within the defined tooth region for each reflectance image;
   registering the plurality of reflectance images; and
   combining the registered plurality of processed images to form a result image that shows the identified caries.

2. The method of claim 1 wherein defining a tooth region comprises computing and using, for each of a plurality of pixels in the plurality of reflectance images, a ratio of the red channel intensity value to the green channel intensity value.

3. The method of claim 1 wherein registering the plurality of images is based on the defined tooth regions within each of the plurality of processed reflectance images.

4. The method of claim 1 further comprising classifying the tooth surface that relates to the defined tooth region as either an occlusal surface or a buccal-lingual surface.

5. The method of claim 4 wherein identifying caries is based on the green and red channel intensity values and based on the tooth surface classification.

6. The method of claim 4 wherein classifying the tooth surface is executed using a trained algorithm.

7. The method of claim 1 further comprising acquiring at least one fluorescence image of the tooth from substantially the same camera position.

8. The method of claim 7 further comprising quantifying the identified caries result by comparison with sound areas of the tooth in the fluorescence image and highlighting the displayed result image according to the quantification.

9. The method of claim 8, wherein quantifying the identified caries result comprises calculating the fluorescence loss over the lesion area or calculating dimensions of the lesion area.

10. The method of claim 1 further comprising highlighting the identified caries in the result image of the tooth that is displayed.

11. The method of claim 1 wherein combining the registered plurality of processed images is an averaging operation.

12. The method of claim 1 wherein registering the plurality of processed images comprises applying one or more affine transforms to one or more of the reflectance images.

13. A method for automatically identifying caries, executed at least in part on data processing hardware, the method comprising:
   acquiring a plurality of reflectance images of a tooth from substantially the same camera position, wherein each reflectance image includes at least red, green, and blue intensity values for a region of pixels corresponding to the tooth;
   defining a tooth region within each of the plurality of reflectance images;
   identifying advanced and early caries within the defined region for each of the plurality of reflectance images to generate a plurality of processed images;
   registering the plurality of processed images;
   combining the registered plurality of processed images to form a result image that shows the identified caries; and
   distinguishing advanced from early caries in the result image that displays.

14. The method of claim 13 wherein identifying the early caries uses local dynamic range calculation.

15. The method of claim 13 further comprising acquiring at least one fluorescence image of the tooth from substantially the same camera position.

16. The method of claim 15 further comprising quantifying the identified early caries by comparison with sound areas of the tooth in the fluorescence image and highlighting the displayed result image according to the quantification.

17. The method of claim 16 wherein quantifying the condition of the identified early caries comprises calculating the fluorescence loss over a lesion area or calculating dimensions of the lesion area.

18. The method of claim 13 wherein registering the plurality of processed images comprises applying one or more image transforms to one or more of the processed images.

19. The method of claim 16 further comprising reconstructing one or more intensity values within a detected lesion.

* * * * *